United States Patent
Brent (10) Patent No.: US 9,108,151 B2
(45) Date of Patent: Aug. 18, 2015

(54) INTEGRATED CHEMICAL PROCESS

(75) Inventor: Geoffrey Frederick Brent, Valentine (AU)

(73) Assignee: ORICA EXPLOSIVES TECHNOLOGY PTY LTD, Melbourne, Victoria (AU)

(*) Notice: Subject to any disclaimer, the term of this patent is extended or adjusted under 35 U.S.C. 154(b) by 1194 days.

(21) Appl. No.: 13/061,168

(22) PCT Filed: Aug. 28, 2009

(86) PCT No.: PCT/AU2009/001118
§ 371 (c)(1), (2), (4) Date: Jul. 7, 2011

(87) PCT Pub. No.: WO2010/022468
PCT Pub. Date: Mar. 4, 2010

(65) Prior Publication Data
US 2011/0256048 A1    Oct. 20, 2011

(30) Foreign Application Priority Data
Aug. 28, 2008 (AU) .................. 2008904443

(51) Int. Cl.
| | |
|---|---|
| B01D 53/62 | (2006.01) |
| B01D 53/80 | (2006.01) |
| B01D 53/96 | (2006.01) |
| C01F 5/24 | (2006.01) |

(52) U.S. Cl.
CPC . *B01D 53/62* (2013.01); *C01F 5/24* (2013.01); *B01D 2251/402* (2013.01); *B01D 2257/504* (2013.01); *Y02C 10/04* (2013.01)

(58) Field of Classification Search
None
See application file for complete search history.

(56) References Cited

U.S. PATENT DOCUMENTS

| | | | |
|---|---|---|---|
| 2,345,655 | A | 4/1944 | Brandenburg |
| 2,384,008 | A | 9/1945 | Brandenburg |

(Continued)

FOREIGN PATENT DOCUMENTS

| | | | |
|---|---|---|---|
| CA | 435489 A | 6/1946 | |
| CA | 435490 A | 6/1946 | |

(Continued)

OTHER PUBLICATIONS

O'Connor, W.K. et al., "DOE/ARC-2001-028: Carbon Dioxide Sequestration by Direct Aqueous Mineral Carbonation." Proceedings of the 25th International Technical Conference on Coal Utilization & Fuel Systems, Coal Technology Association, Clear Water, FL (Mar. 5-8, 2001).*

(Continued)

*Primary Examiner* — Stanley Silverman
*Assistant Examiner* — Daniel Berns
(74) *Attorney, Agent, or Firm* — Lando & Anastasi, LLP (57) ABSTRACT

A process for converting carbon dioxide into solid material, which process comprises the steps of: (a) direct thermal activation of magnesium silicate hydroxide mineral feedstock by combustion of fuel to produce an activated feedstock; (b) separation from the activated feedstock of metal oxides at least substantially excluding magnesium oxide and magnesium silicate to produce a residual activated feedstock; (c) before or after said separation step suspension of the activated feedstock in a solvent to form a slurry; and (d) contacting the slurry of residual activated feedstock with carbon dioxide to convert the carbon dioxide into magnesium carbonate.

25 Claims, 3 Drawing Sheets

(56) References Cited

U.S. PATENT DOCUMENTS

| | | | |
|---|---|---|---|
| 2,384,009 A | | 9/1945 | Brandenburg |
| 2,384,010 A | | 9/1945 | Brandenburg |
| 3,875,749 A | * | 4/1975 | Baciu .......................... 60/641.2 |
| 5,374,593 A | * | 12/1994 | Huard et al. .................. 501/122 |
| 2007/0261947 A1 | | 11/2007 | Geerlings et al. |
| 2012/0288431 A1 | * | 11/2012 | Chizmeshya et al. ........ 423/331 |

FOREIGN PATENT DOCUMENTS

| | | |
|---|---|---|
| CA | 435491 A | 6/1946 |
| WO | 2008061305 A1 | 5/2008 |
| WO | 2008142025 A2 | 11/2008 |
| WO | 2009092718 A1 | 7/2009 |

OTHER PUBLICATIONS

International Search Report from corresponding International Application No. PCT/AU2009/001118 dated Sep. 30, 2009.

International Preliminary Report on Patentability from corresponding International Application No. PCT/AU2009/001118 dated Mar. 1, 2011.

* cited by examiner

INTEGRATED CHEMICAL PROCESS

The present invention relates to a process for the permanent and safe sequestration of carbon dioxide gas and is particularly concerned with an efficient and economically viable integrated process for the chemical conversion of carbon dioxide to solid carbonates thereby reducing the accumulation of carbon dioxide in the atmosphere.

The sequestration of carbon dioxide gas in repositories that are isolated from the atmosphere is a developing technology that is widely recognised as an essential element in global attempts to reduce carbon dioxide emissions to the atmosphere. The rapid increase in atmospheric carbon dioxide concentrations is of concern due to its properties as greenhouse gas and its contribution to the phenomena of global warming and climate change. Prototype demonstration facilities for the capture and sequestration of carbon dioxide exist in several countries. While various technologies exist for the capture and concentration of carbon dioxide in combustion flue gases, most current facilities utilise underground sequestration known as geosequestration. This may occur in depleted oil or gas reservoirs or other underground porous formations that are suitably isolated from the atmosphere. These reservoirs or formations may be situated under land or sea. Another possible subterranean repository for carbon dioxide gas is so-called saline aquifers. Direct storage of carbon dioxide in the deep ocean has also been investigated but has yet to be successfully demonstrated on any significant scale.

Another field of study is that known as mineral carbonation; whereby carbon dioxide is chemically reacted with alkaline and alkaline-earth metal oxide or silicate minerals to form stable solid carbonates. The use of this route in a mineral carbonation process plant using minerals that have been extracted and processed is known as ex-situ mineral carbonation, as opposed to in-situ carbonation whereby carbon dioxide is deposited into underground mineral formations and reacts over longer timeframes with such minerals in existing underground formations. The present invention is concerned with the ex-situ approach to carbon dioxide sequestration via mineral carbonation.

Mineral carbonation has a number of potential advantages over other methods of carbon dioxide sequestration. These include relative permanence and stability and the elimination of any risks of leakage of carbon dioxide gas. Furthermore, suitable subterranean sites for geosequestration do not exist at all locations where they are required. The chemical reactions of mineral carbonation are also thermodynamically favoured, with an exothermic release of energy due to the formation of the carbonates. Many of the minerals required for mineral carbonation are abundant and widely distributed globally. These minerals may be readily mined and subjected to known comminution and other technologies. They are generally benign and the environmental and safety risks are readily manageable. In particular, the mineral broadly known as serpentine has been estimated to be available in quantities sufficient to sequester all global emissions of carbon dioxide from known fossil fuel reserves. The present invention focuses on a process for mineral carbonation of magnesium silicate hydroxide such as serpentine or talc. The mineral carbonation chemical reaction for serpentine is given here:

$$\tfrac{1}{3}Mg_3Si_2O_5(OH)_4 + CO_2 = MgCO_3 + \tfrac{2}{3}SiO_2 + \tfrac{2}{3}H_2O$$

The invention assumes that a stream containing carbon dioxide is available for such mineral carbonation. Such streams may originate from flue gases from any combustion process, especially those for production of steam for electricity generation, or from processes known in the art as gasification or gas reforming, as well as from typical chemical manufacturing processes such as ammonia or Portland cement manufacture. The concentration of carbon dioxide in such streams may be substantially raised via technological routes known in the field. These include so-called carbon capture technologies such as those employing membrane separation technology or alternatively those employing carbon dioxide solvents such as amines, ammonia or ammonia compounds. In the latter case, these solvents capture the carbon dioxide from dilute streams such as flue gases and then undergo solvent regeneration to release the concentrated streams of carbon dioxide and the regenerated solvent for use in further capture. Alternatively, in a process known as "oxy-fuel combustion", streams of concentrated carbon dioxide and water vapour may be formed directly in the combustion processes via the use of oxygen rather than air to feed the combustion process. Another process known as gasification produces hydrogen and relatively pure carbon dioxide streams through the gasification of hydrocarbonaceous fuels under suitable process conditions.

The present invention is concerned with the solidification of carbon dioxide, for example carbon dioxide present in the gas streams mentioned above, in the process of mineral carbonation as described herein. While it is advantageous to use highly concentrated streams of carbon dioxide in the present invention, the use of lower purity streams is not precluded. In particular, the presence of water in such streams is not necessarily unfavourable since the process uses aqueous slurries whose water content may be readily adjusted if required. Furthermore, the key aspects of the current invention may be applied to slower or less intensive processes for carbon dioxide sequestration. These may include for example carbon dioxide sequestration from the atmosphere.

The present invention provides significant improvements over previous processes. In particular this invention improves an earlier process described in the Applicant's own published International patent application WO2008/061305. That invention described an integrated direct fuel-fired activation process for alkali or alkali earth metal silicate mineral feedstocks such as serpentine and the necessary integrated solvent processes for the carbonation reactions required for viable ex-situ sequestration. Relevant prior art was also acknowledged in WO2008/061305 and may be taken as reference prior art for the present invention.

The present invention renders the overall process more economically favourable than previously anticipated and more competitive with alternative forms of carbon dioxide sequestration. The process thereby provides a more economically favourable means of conversion of carbon dioxide into stable magnesium carbonate for reducing the amount of carbon dioxide released to the atmosphere.

Accordingly, the present invention provides a process for the solidification of carbon dioxide by reacting of carbon dioxide with magnesium silicate hydroxide mineral feedstock which process comprises direct thermal activation of the magnesium silicate hydroxide feedstock by combustion of fuel to produce an activated feedstock, separation from the activated feedstock of metal oxides at least substantially excluding magnesium oxide and magnesium silicate to produce a residual activated feedstock, before or after said separation step suspension of the activated feedstock in a solvent to form a slurry, and contacting the slurry of residual activated feedstock with carbon dioxide to convert the carbon dioxide into magnesium carbonate.

An important aspect of the present invention involves the separation of metal oxides other than magnesium oxide and magnesium silicate from the activated feedstock after the direct fuel-fired thermal activation of the feedstock. As taught by WO2008/061305, activation is achieved by combustion of a fuel with the heat released by said combustion being applied directly to the feedstock. The said direct thermal activation of magnesium silicate hydroxide mineral feedstock results in the formation of forsterite or magnesium silicate, magnesium oxide, silica and water together with other, usually minor in proportion, constituent metal oxides originally present in the said mineral feedstock.

It has now been discovered that the separation of metal oxides, other than magnesium oxide and magnesium silicate, may advantageously be performed after the process of direct thermal activation to produce a residual activated feedstock stream richer in magnesium oxide and magnesium silicate and with reduced quantities of other metal oxides prior to reaction with carbon dioxide. Such removal of other metal oxides substantially reduces the downstream process requirements. Metal oxides that can be removed in this process include oxides of one or more of iron, silicon, aluminium, manganese, chromium, nickel, titanium, copper, potassium, phosphorus, calcium and sodium. Oxides that are of low commercial value such as those of silicon and aluminium, or are present in insufficient quantities to be of commercial value, such as those of potassium, phosphorous and sodium, can thus be withdrawn from the process for waste disposal. Those metal oxides of sufficient commercial value contained in the feedstock can thus also be recovered from the separated stream after such direct thermal activation. Such minerals would typically comprise the oxides of iron chromium, nickel and manganese.

Thus, the separation of silica and other metal oxides after direct thermal activation reduces the downstream process requirements and costs while the recovery of the valuable metal oxides provides a revenue stream. The overall process is thus rendered more economically competitive with other forms of carbon dioxide sequestration.

In accordance with the present invention, the separation of metal oxides at least substantially excluding magnesium oxide and magnesium silicate after direct thermal activation may be achieved by various separation means, such as density or gravity separation, centrifugal separation, flotation, filtration, magnetic separation, electrostatic separation and combinations of one or more thereof. Particularly advantageous density separation technologies for the purpose of this invention include processes using spirals, hindered settling vessels, cyclones, hydrocyclones and combinations thereof. Combinations of density separation and magnetic separation may be particularly beneficial, for example for recovering and concentrating iron ore in particular.

It will be understood by those skilled in the art that such separation processes have associated separation efficiencies, thus invariably resulting in imperfect separation and thus carry-over of some portion of the components to be separated into the other, separated, stream. For example, a proportion of the metal oxides to be separated from the residual activated feedstock stream will invariably be carried over into said residual activated feedstock stream and vice versa. A certain proportion of magnesium oxide and/or magnesium silicate may thus also be lost into the separated metal oxide streams. However, the aim is to substantially retain the largest proportion of the magnesium oxide and magnesium silicate in the residual activated feedstock stream. Hence metal oxides, at least substantially excluding magnesium oxide and magnesium silicate are separated from the residual activated feedstock after direct thermal activation. For the purposes of the present invention "at least substantially excluding magnesium oxide and magnesium silicate" generally means excluding at least 50% of the total magnesium oxide and magnesium silicate originally present in the activated feedstock after direct thermal activation. Thus, at least 50% of the magnesium oxide and magnesium silicate is retained in the residual activated feedstock stream. Preferably, a higher proportion of the magnesium oxide and magnesium silicate is retained in said residual activated feedstock stream, most preferably in excess of 75% by weight.

The use of density separation has been found to be particularly advantageous as it permits metal oxides which are generally of low economic value to be separated into a low density stream while also separating the metal oxides of high economic value into a high density stream. The residual activated feedstock stream containing most of the originally present magnesium oxide and magnesium silicate forms a stream of intermediate density for the subsequent process of conversion into magnesium carbonate.

The residual activated feedstock is suspended in a solvent slurry and subsequently contacted with carbon dioxide to convert the carbon dioxide to magnesium carbonate. Preferably, said residual activated feedstock is contacted with supercritical, liquefied or high-pressure gaseous carbon dioxide to substantially convert the carbon dioxide to magnesium carbonate. The term high-pressure in the context of this disclosure refers to pressures in excess of 5 bar, more preferably in excess of 50 bar.

Typically, the magnesium silicate hydroxide mineral feedstock comprises mostly (at least 50% by weight) serpentine or talc.

In general the magnesium silicate hydroxide mineral feedstock will be subjected to comminution by crushing and/or grinding subsequent to its extraction. As described in WO2008/061305, comminution to the final desired particle size distribution for the carbonation reaction may be done either before or after the direct thermal activation step. The final desired particle size distribution for the carbonation reaction is about 75 microns or less. While grinding to this size may be performed before the direct thermal activation, it may be advantageous to perform initial coarser comminution to a size of about 500 microns or less prior to the direct combustion heating followed by subsequent further comminution to the said final desired particle size for the carbonation reaction. Such subsequent grinding may advantageously be done in a wet grinding process with the activated feedstock mixed with solvent slurry prior to the metal oxide separation step. The initial coarser comminution before the direct thermal activation step may advantageously be done in a dry grinding process, thereby reducing the heat load required in the said direct thermal activation step.

The most preferable process involves optimal use of heat integration throughout the process. Heat recovered in cooling operations is optimally employed to provide heat or energy where required. For example, pre-heating of the magnesium silicate hydroxide mineral feedstock may be achieved using one or more heating vessels utilising heat recovered from various points in the process. These points include the exothermic carbonation reaction, which will generally take place in reaction vessels maintained at temperatures below 200 degrees Celsius, more commonly below about 150 degrees Celsius, the compression of the carbon dioxide, the hot flue gases from the direct thermal activation process including the water vapour released by dehydroxylation and the hot activated feedstock after direct thermal activation. Heat recovered from these points may be used in other process steps requiring heat input such as said pre-heating of the magnesium silicate hydroxide mineral feedstock, and heating of the residual activated feedstock slurry stream to the carbonation reactor vessel temperature. Further heating may also be achieved by integration with an associated combustion, gasification, reforming or electricity generation plant, whose carbon dioxide emissions are the subject of the current sequestration process. In particular, use may be made of any low-grade heat recovered from said associated plant that cannot be used in electricity generation turbines or other processes within said associated plant. Advantageously, the magnesium silicate hydroxide mineral feedstock and/or air for combustion may be pre-heated using such recovered heat prior to entering the combustion heating vessel. Alternatively, energy recovered from said cooling operations may be employed to drive pumps or compressors. In this regard, steam from any said cooling operations may particularly advantageously be employed in driving pumps or compressors for compression of the carbon dioxide.

Thus, in an embodiment of the invention the magnesium silicate hydroxide mineral feedstock is pre-heated prior to direct thermal activation by application of the heat released by combustion of the fuel using heat liberated from the reaction of carbon dioxide with the activated feedstock and/or low grade or waste heat drawn from an associated carbonaceous or hydrocarbonaceous fuel combustion, gasification, reforming or electricity generation process and/or heat drawn from cooling the products from the fuel-fired heating vessel and/or heat drawn from cooling the carbon dioxide after compression.

As disclosed in WO2008/061305, the magnesium silicate hydroxide mineral feedstock, preferably pre-heated as disclosed herein, is finally heated in a suitable heating vessel utilising the heat released form combustion of a hydrocarbonaceous fuel to its required activation temperature of at least about 580° C., for example from about 580 to 1200° C., such as from about 580 to 800° C. The process of dehydroxylation occurs under these conditions, releasing water vapour. The magnesium silicate hydroxide is also converted to magnesium silicate or forsterite, releasing silica. These temperatures are considerably lower than those typically employed in calcining operations, making the use of such a heating vessel more energy efficient and allowing lower cost refractory materials to be used in its construction, reducing costs.

Combustion fuels used to supply the heat to the heating vessel wherein direct thermal activation occurs may be chosen from any convenient hydrocarbonaceous fuel. Fuels available to the associated combustion, gasification, reforming or electricity generation plant will generally be convenient for the current purpose. As taught in WO2008/061305, such fuels may include coal, oil, natural gas, methane or longer chain alkanes or variants or mixtures thereof. As further taught in WO2008/061305, such fuel may substantially or partially also comprise hydrocarbonaceous material derived from renewable biomass. Preferred fuels include natural gas or other mixtures of alkanes since they are more efficient. The combustion of said fuel in the process of direct thermal activation forms additional carbon dioxide to that subject to the present sequestration process. Thus it is advantageous in an overall process sense to minimise such additional carbon dioxide. Fuels such as natural gas, alkanes or renewable biomass assist in achieving such minimisation.

As further taught in WO2008/061305, the direct thermal activation of the said magnesium silicate hydroxide mineral feedstock may take place in any suitable heating vessel. This will usually take the form of a kiln, furnace or similar combustion chamber or heating vessel. The feedstock may be contacted with the combustion gases from the fuel or may be heated in isolation from the combustion gases via radiation, conduction or convection from the fuel combustion chamber. The use of an intermediate heat transfer fluid between the combustion chamber and the said mineral feedstock is not precluded, however it is less efficient. The use of other means such as electricity to provide the heat, such as in an electric furnace, does not constitute direct thermal activation and hence is unsuitable due to excessive energy requirements.

Where the magnesium silicate hydroxide mineral feedstock is heated by direct contact with the combustion gases from the fuel, it is preferable to use an oxygen lean combustion mixture in the combustion chamber. This requires oxygen content below the exact stoichiometric requirement for complete combustion of the hydrocarbonaceous fuel. This will reduce the extent of further oxidation of iron oxides contained in the said feedstock and improve the economic value of the iron oxides that are separated in the subsequent stage.

The feedstock is typically transported as a ground solid through the series of heat exchangers including the final heating vessel where the feedstock is raised to its final activation temperature by the heat released by combustion of fuel. As taught in WO2008/061305, the heat activation vessel may be of vertical shaft design comprising one or more substantially vertical chambers and wherein the feedstock is charged and flows counter-currently to gases produced by the combustion of the fuel. Alternatively, the solid feedstock may be transported through the series of heat exchangers including the final heating vessel in fluid media in pipes or vessels, such fluids being either gases or liquids.

Agitation of the mineral feedstock in the heating vessel where thermal activation occurs is beneficial to the process of activation of the feedstock and to the liberation of any free silica phases and may advantageously be employed in the heating vessel. The heating vessel may be designed to provide turbulent or dispersive or attritive conditions to assist in achieving the dehydroxylation of the feedstock essential for activation. Thus, the heating vessel may be designed to rotate and/or agitate the feedstock during heating thereof to assist in dehydroxylation (activation). Such agitation may be applied via rotation in rotary kilns, preferably in the presence of some additional grinding and/or agitation media such as steel balls. Alternatively, some agitation may be obtained via countercurrent gas flow in shaft or tower kilns or fluidised bed furnaces, again preferably in the presence of some additional grinding and/or agitation media.

Water of dehydroxylation released during the thermal activation is advantageously recovered in a subsequent condenser for use within the process in the aqueous slurry.

In a preferred embodiment the feedstock is heated in the series of heat exchangers including the final heating vessel in an essentially dry state such that the feedstock is transported through said heat exchangers and heating vessels without the addition of any liquid to said feedstock thereby decreasing the thermal requirements for the heating process. In this case the use of dry means of transport of the feedstock through the heat exchangers and heating vessel may involve mechanical motion or a gas carrier medium.

Transport of the mineral feedstock through pipes or chambers in the heat exchangers and heating vessel may alternatively be achieved by two-phase fluid/solid flow, said fluids comprising either gases or liquids. For the case of gas/solid flow, the carrier gas provides agitation and efficient heat transfer which may be enhanced by high gas flow rates during transport of said mineral feedstock through the heat exchangers and heating vessel.

Alternatively, the mineral feedstock may be transported through the heat exchangers and heating vessels as a slurry suspended in a liquid carrier. In such cases, it is preferable that the ratio of liquids to solids in the direct thermal activation stage be kept low, and usually lower than that employed in the later carbonation step in order to reduce thermal energy requirements in raising the slurry feedstock to its desired activation temperature of at least about 580° C., for example from about 580° C., for example from about 580 to 1200° C., such as from about 580 to 800° C. Under these conditions such liquids will generally be superheated. The presence of such a liquid carrier may assist in the dehydroxylation of the magnesium silicate hydroxide mineral feedstock and liberation of silica by providing efficient heat transfer, turbulent flow and some dissolution of the magnesium and by assisting disruption of silica layers. In the embodiments for transport of the feedstock via fluid carriers, said carriers comprising either gases or liquids, the thermal energy supplied to the heating vessel may be reduced via recycling of the carrier fluid through said heating vessel. The solid mineral feedstock may be substantially separated from the carrier fluid after exiting the heating vessel and said carrier fluid recycled to carry more mineral feedstock through the heating vessel, thus maintaining most of the thermal energy of the heated fluid. Substantial solid/fluid separation may be achieved by well-known process methods such as density separation, centrifugal separation or filtration.

After the direct thermal activation step, an optional second fine grinding stage may be employed where the initial comminution was relatively coarse, in order to reduce the particle sizes to 75 micron or less. This fine grinding may be performed either wet or dry. Where wet grinding is performed, this will be done with the addition of just sufficient aqueous media to enable efficient grinding.

The separation of silica and/or other valuable minerals is effected prior to the carbonation reaction. This separation may be achieved via various means known to the mineral processing industry including density or gravity separation, centrifugal separation or filtration, flotation, magnetic or electrostatic separation or combinations thereof. Density separation provides a particularly suitable route. Density separation may be achieved through the use of technologies known to those skilled in the art such as hindered settlers, cyclones, hydrocyclones spirals, jigs and the like. Water may be added to enable efficient operation of these units. The free silica and other low value metal oxides are removed as a low density fraction and the iron other valuable metal oxides are be removed as high density fractions. Further enrichment of iron oxides may be achieved via magnetic or electrostatic separation. Where water is added to these operations, it may be recovered from the separated metal oxide streams for re-use in the process. The residual activated feedstock, constituting the major fraction of intermediate density, is then richer in magnesium content rendering it more effective for the subsequent carbonation reaction.

The residual activated and finely ground feedstock is then suspended in the slurry solution that is required for the carbonation reaction. The solvents are typically weakly acidic aqueous or mixed aqueous and/or saline or other solvents miscible with carbon dioxide. The solvents may be chosen from any of water, weak acids such as those known in the prior art for example acetic acid, oxalic acid, ascorbic acid, phthalic acid, orthophosphoric acid, citric acid, formic acid or salt solutions of such weak acids, saline solutions, aqueous saline and sodium bicarbonate solutions, potassium bicarbonate solutions, mixed aqueous and alcohol solutions such as aqueous ethanol or methanol solutions, mixed aqueous and glycol solutions, mixed aqueous and glycerol solutions, or any combination thereof. Advantageously, an aqueous solvent system comprising an aqueous saline solution with sodium bicarbonate may be employed. Other suitable solvents that have been identified by workers in this field include aqueous saline potassium bicarbonate solutions.

The said residual activated feedstock suspended in the solvent is then contacted with carbon dioxide to form magnesium carbonate. Preferably, the said activated feedstocks suspended in the solvents are contacted with supercritical, liquefied or high-pressure gaseous carbon dioxide in highly turbulent or rapidly dispersive or attritive reaction vessels to substantially convert the carbon dioxide to carbonates. Preferably pressures in the range 10-200 bar, more preferably 50-160 bar and temperatures in the range 10-250 degrees Celsius, more preferably 10-175 degrees Celsius are employed in the reaction vessels.

Suitable reaction vessels may comprise high-pressure agitated vessels, pipeline reactors or the like, or more preferably, high velocity reaction vessels to promote turbulence, rapid mixing and attrition of the said activated feedstocks. Fluidised bed reactors particularly with the addition of grinding media may be advantageously employed.

The conversion of the feedstock to magnesium carbonate in the reactor where the residual activated feedstock reacts with pressurised carbon dioxide is improved by the use of a circulating recycle stream which circulates and returns unreacted feedstock, solvent and other reagents to the carbonation reaction vessel. A further separation step may advantageously be employed in this recycle stream to remove the silica and magnesium carbonate reaction products from the carbonation reaction, which converts the forsterite or magnesium silicate into magnesium carbonate and silica. Thus, the recycle stream incorporates a further separation stage that substantially separates silica and magnesium carbonate from substantially unreacted feedstock to return said substantially unreacted feedstock to the reactor.

As used in the separation process after direct thermal activation, various separation means such as gravity or density separation may again be advantageously used to effect separation from the recycle stream. The silica and fully-reacted magnesium carbonate may be removed as a lower density fraction while the remaining unreacted magnesium silicate constituting the higher density fraction can be substantially recycled back to the carbonation reactor. The removed silica and magnesium carbonate is dewatered and the solid carbonate and silica residues are withdrawn for final disposal, usually back to the serpentine mine or quarry. The recovered solvents and the unreacted feedstock are recycled to the reactor. A portion of the silica and magnesium carbonates may be further processed as necessary to produce a further product for sale.

It will be appreciated by those skilled in the art that the use of said process units such as kilns, furnaces or other heating vessels, comminution processes, separation processes and reaction vessels referred to in this specification is not limited to any particular number of such vessels. Plural such units may be employed, either in series or parallel, in order to provide the required process throughput for any particular mineral carbonation facility. For example, in order to solidify and sequester about 15 million tonnes of carbon dioxide produced annually by a gigawatt-scale coal-fired electricity generation plant, about 40 million tonnes of serpentine mineral would need to be processed annually. This requires a facility processing in excess of 100 kilotonnes of serpentine per day or in excess of 4500 tonnes per hour. Multiple large parallel processing units are required to meet such throughput.

Another application of this invention may be in the sequestration of carbon dioxide drawn from dilute streams or directly from the atmosphere in order to reduce the carbon dioxide concentration in the atmosphere to mitigate the effects of global warming and climate change. It will be apparent to those skilled in the art that the processes such as those disclosed in the current invention may be adapted and used for such absorption and solidification of carbon dioxide from the atmosphere. Key aspects and the associated process improvements and applications disclosed herein may be employed in such processes. In particular, the use of direct thermal activation processes via combustion of a fuel disclosed herein and the subsequent metal oxide separations as well as the solvent processes as described herein and the other various process improvements and applications described herein may be employed in such capture of carbon dioxide from the atmosphere. As described herein, metal oxides substantially excluding magnesium oxide and magnesium silicate that are separated from the activated feedstock may be either disposed back to the mine or quarry or further processed for sale as commercial products.

Atmospheric carbon dioxide may be concentrated prior to reaction, or may be sequestered in dilute form, including by direct reaction with atmospheric carbon dioxide. In the former case, absorption towers may utilise ammonia or dissolved ammonia compounds such as ammonium carbonate to absorb the carbon dioxide from air streams passing through the towers by converting it to ammonium bicarbonate. The carbon dioxide may then be released in a concentrated stream and the ammonium carbonate regenerated by application of heat. The concentrated stream of carbon dioxide is then processed in the same process as described herein before. In the latter case, the sequestration may proceed more slowly than in high-pressure reaction vessels, nevertheless using magnesium silicate hydroxide feedstock activated and subjected to metal oxide separation as taught herein. Metal oxides of economic value can be further processed for sale while low value metal oxides can be disposed back to the magnesium silicate hydroxide mine. Systems of open vessels, fields, slurry dams, absorption towers, aerated stockpiles or heap leach arrangements containing the residual activated magnesium silicate hydroxide mineral feedstock mixed with suitably selected slurry solvents may be employed in this application. Such vessels, fields, slurry dams, absorption towers or aerated stockpiles or heap leach arrangements may be designed to optimally expose the activated mineral to carbon dioxide, preferably first dissolved as carbonic acid in aqueous media, via systems of sprays, atomizers, or channels. The reacted activated mineral, in the form of magnesium carbonates, should be periodically removed to allow exposure of unreacted activated feedstock to the carbon dioxide or carbonic acid/aqueous flows. In the case of stockpiles for example, reacted layers may be periodically scraped off the exposed surfaces of said stockpiles. The removed material comprising carbonates may then be transported for disposal, such disposal being advantageously back in mined-out areas of the magnesium silicate hydroxide feedstock mine or quarry.

Various embodiments of a method for long-term sequestration of carbon dioxide into solid magnesium carbonates in accordance with the present invention will now be described, by way of example only, with reference to the accompanying drawings.

Figure 1:
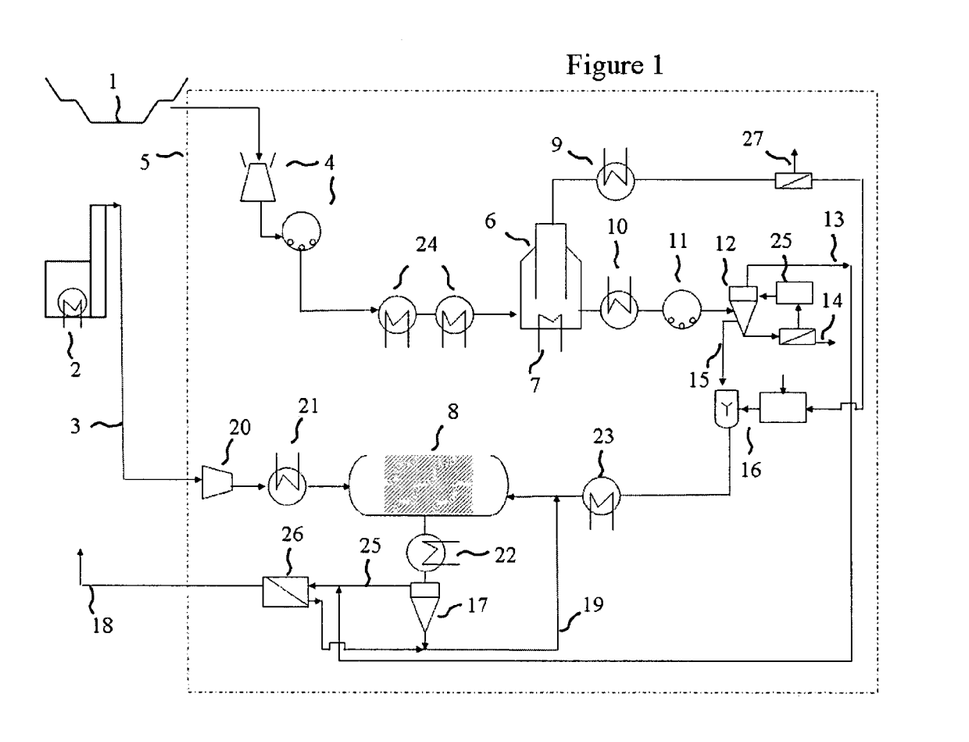
FIGS. 1 to 4 are flow diagrams illustrating the process of the present invention.

FIG. 1 illustrates a generalised flow diagram of the invention. It shows a process for activation of serpentine ore, using the methodology of this invention. It shows a mine or quarry (1) where the serpentine ore is extracted, an associated combustion, gasification, reforming or electricity generation plant (2) whose carbon dioxide emissions are to be sequestered and a stream (3) containing the said carbon dioxide entering a mineral carbonation plant (5) designed according to the methodology of this invention. The serpentine ore is crushed and ground in comminution circuits (4) to a particle size of less than 500 microns and fed into a series of heat exchangers (24) to preheat the mineral feedstock and a final heating vessel (6) for direct thermal activation. The series of optional heat exchangers (24) utilise heat drawn from other points in the process where cooling is effected. Such points include cooling the carbonation reactor products (22), cooling the compressed carbon dioxide gas (21) and cooling the activated feedstock after thermal activation (10). The final and essential heating vessel (6) comprises a furnace fired by a hydrocarbonaceous fuel, in this case natural gas (7), to provide direct thermal activation of the ore raising its temperature to at least around 580° C. Water of dehydroxylation is recovered from the flue gases in a condenser (9), separated from the remaining flue gases (27) and used in the process, for example as shown here in making up the final aqueous slurry (16) prior to the carbonation reactor (8).

After cooling, the activated ore is further ground to the desired final particle size of less than 75 microns, here in a wet milling process (11). Further water may be added (25) for operation of the separation stage (12), where metal oxides (14) and (13) are substantially separated from the residual activated magnesium silicate feedstock (15) using density separation. In this example the metal oxide separation stage (12) comprises a series of hindered settling tanks in combination with hydrocyclones. The low density fraction (13) comprises metal oxides such as silica which are of low economic value and may be disposed (18) back to the mine (1) after recovery (26) of the solvent which is recycled into the process, for example at (19) as shown here. The high density fraction (14) comprises metal oxides of high economic value such as iron oxides and which are further processed for sale after recovery of aqueous solvents which are re-used in the process. The residual activated feedstock (15) comprising largely magnesium silicate then enters the carbonation reactor vessel (8) after make-up with the desired solvent system and other reagents (16) and after heating (23) to the desired reaction temperature, in this case 155 degrees Celsius.

The carbonation reaction (8) vessel may advantageously utilise agitation and attrition, either via mechanical means or flow-induced. In this example the solvent system (16) is an aqueous mixture of water with sodium chloride and sodium bicarbonate. The carbon dioxide-containing stream (3) from the associated combustion, gasification, reforming or electricity generation plant (2) is compressed via a system, of compressors (20) to a liquid form or to a pressure in excess of 115 bar prior to entering said carbonation reactor vessel (8). Heat may be recovered (21) from the system of compressors and utilised in other parts of the process requiring heat input, for example at heat exchangers (24). A recycle stream (19) circulates substantially unreacted material back to the carbonation reactor (8), after separation of a low density fraction substantially comprising silica and magnesium carbonate reaction products (25) which are withdrawn from the second separation process (17) comprising density separation. The higher density fraction comprises largely unreacted feedstock with a high content of magnesium silicate which is recycled (19) back to the reactor (8). The density separation process (17) in this example is a series of hydrocyclones. The low density stream (25) is substantially dewatered in settling tanks and filters (26) and the substantially solid carbonate and silica residues (18) are withdrawn for final disposal back to the mine or quarry (1) and the recovered solvent is reused in the process, here at (19).

The process illustrated in FIG. 1 has been found to be economically viable for the permanent solidification of 14 Mt per annum of carbon dioxide emissions from a conventional pulverised fuel electricity generation plant in Australia. The power station has four 660 MW generators that export about 15500 GWh per annum to the electricity grid and consumes 6.4 Mt per annum of black coal. The process shown in FIG. 1 achieves over 80% permanent carbon dioxide sequestration consuming about 32 Mt per annum of serpentine and 0.85 Mt per annum of natural gas in the fuel-fired furnaces that activate the serpentine. Delivered electricity from the electricity generation plant would be reduced to 98% of the original supply without sequestration due to the requirement to supply electricity for the comminution of the serpentine. The process will avoid over 11 Mt per annum of carbon dioxide at a cost, of less than Australian dollars A$9 per tonne of carbon dioxide, after taking into account the sale of iron oxide recovered from this process.

Figure 2:
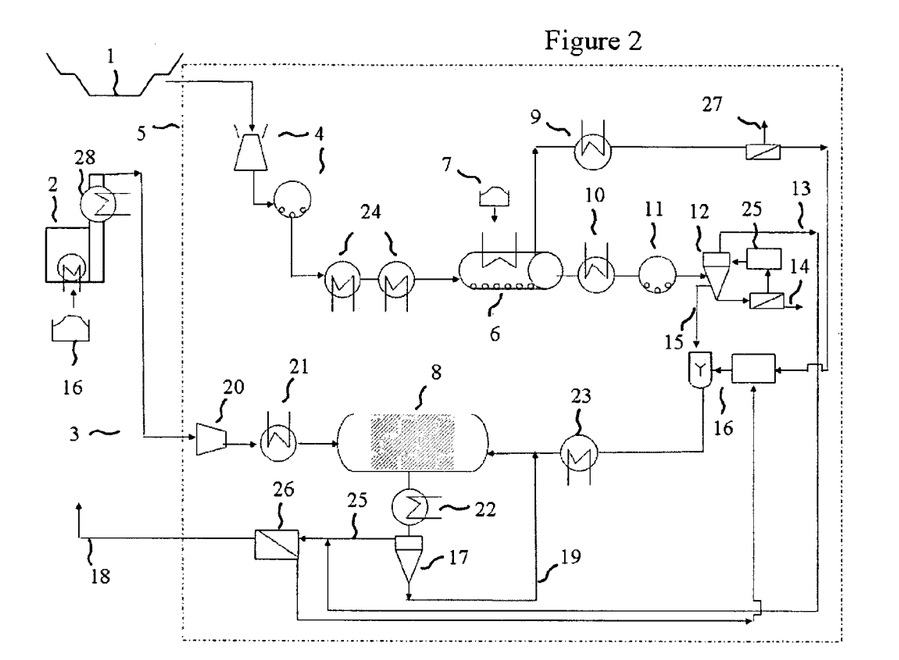

FIG. 2 illustrates a second generalised flow diagram showing another embodiment of the invention. It shows a process for activation of serpentine ore, using the methodology of this invention. It shows a mine or quarry (1) where the serpentine ore is extracted, an associated combustion, gasification, reforming or electricity generation plant (2) whose carbon dioxide emissions are to be sequestered and a stream (3) containing the said carbon dioxide entering a mineral carbonation plant (5) designed according to the methodology of this invention. In this example, the associated combustion, gasification, reforming or electricity generation plant (2) utilises a substantial proportion of renewable biomass (16) as hydrocarbonaceous feedstock, in this case greater than 20%. This allows for an overall net withdrawal of carbon dioxide from the atmosphere, since most of the emissions from the associated combustion, gasification, reforming or electricity generation plant (2) are sequestered in this process and the regrowth of the biomass feedstock 916) to sustain this process withdraws carbon dioxide from the atmosphere.

The serpentine ore is crushed and ground in comminution circuits (4) to a particle size of less than 500 microns and fed into a series of heat exchangers (24) to preheat the mineral feedstock and a final heating vessel (6) which in this example comprises a rotary kiln for direct thermal activation. The series of optional heat exchangers (24) utilise heat drawn from other points in the process where cooling is effected. Such points include cooling the carbonation reactor products (22), cooling the compressed carbon dioxide gas (21) and cooling the activated feedstock after thermal activation (10). In this example, low grade or waste heat (28) drawn from the associated combustion, gasification, reforming or electricity generation plant (2) is utilised in preheating (24) the mineral feedstock. The final and essential heating vessel (6) comprises a rotary kiln or similar combustion chamber fired by a hydrocarbonaceous fuel in this case pulverised coal supplemented by renewable biomass fuel (7), to provide direct thermal activation of the ore raising its temperature to at least around 580° C. The use of renewable biomass fuel here reduces the addition of carbon dioxide to the atmosphere from the combustion of the fuel and improves the net sequestration of carbon dioxide achieved by the overall process. Water of dehydroxylation is recovered from the kiln flue gases in a condenser (9), separated from the reaming flue gases (27) and used in the process, for example as shown here in making up the final aqueous slurry (16) prior to the carbonation reactor (8).

After cooling, the activated ore is further ground to the desired final particle size of less than 75 microns, in a further milling process (11). Water may optionally be added (25) for operation of the separation stage (12), where metal oxides (14) and (13) are substantially separated from the residual activated magnesium silicate feedstock (15) using density separation. In this example the metal oxide separation stage (12) may comprise cyclones or a series of spirals and hindered settling tanks in combination with hydrocyclones. The low density fraction (13) comprises metal oxides such as silica which are of low economic value and may be disposed (18) back to the mine (1) after recovery (26) of the water which is recycled into the process, for example at (16) as shown here. The high density fraction (14) comprises metal oxides of high economic value such as iron oxides which are further processed for sale after recovery of aqueous solvents which are re-used in the process. The residual activated feedstock (15), comprising largely magnesium silicate then enters the carbonation reactor vessel (8) after make-up with the desired solvent system and other reagents (16) and after heating (23) to the desired reaction temperature, in this case 155 degrees Celsius.

The carbonation reaction (8) vessel may advantageously utilise agitation and attrition, either via mechanical means or flow-induced. In this example the solvent system (16) is an aqueous mixture of water with sodium chloride and sodium bicarbonate. The carbon dioxide-containing stream (3) from the associated combustion, gasification, reforming or electricity generation plant (2) is compressed via a system, of compressors (20) to a liquid form or to a pressure in excess of 115 bar prior to entering said carbonation reactor vessel (8). Heat may be recovered (21) from the system of compressors and utilised in other parts of the process requiring heat input, for example at heat exchangers (24). A recycle stream (19) circulates substantially unreacted material back to the reactor, after separation of a low density fraction substantially comprising silica and magnesium carbonate reaction products (25) which are withdrawn from the second separation process (17) using density separation. The higher density fraction comprises largely unreacted feedstock with a high content of magnesium silicate which is recycled (19) back to the reactor (8). The density separation process in this example is a series of hydrocyclones. The low density stream (25) is substantially dewatered in settling tanks and filters (26) and the substantially solid carbonate and silica residues (18) are withdrawn for final disposal back to the mine or quarry (1) and the recovered solvent is reused in the process, here at (16).

Figure 3:
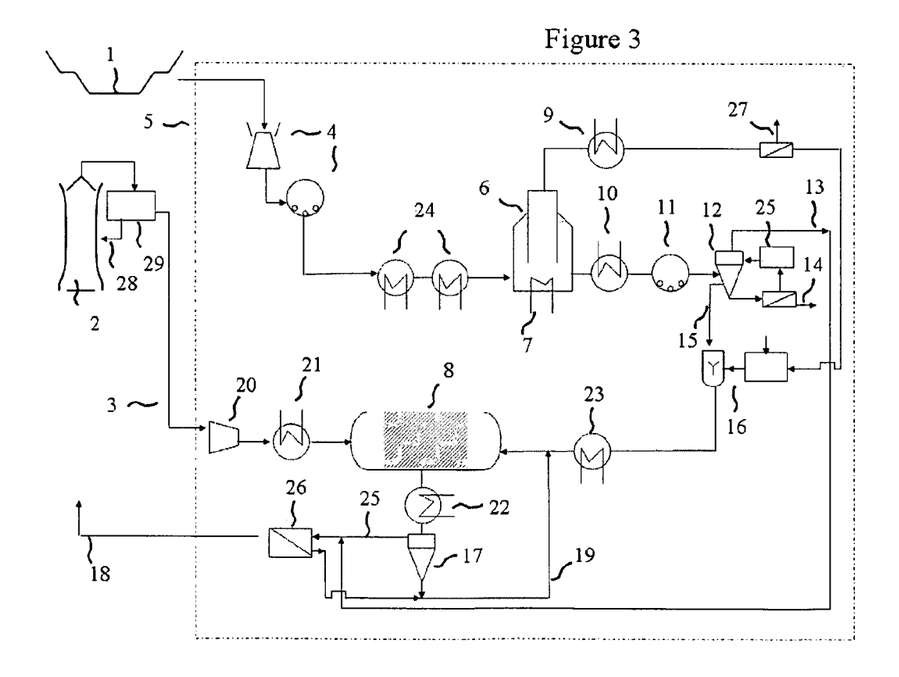

FIG. 3 illustrates another flow diagram of a particular embodiment of the invention. In this example the mineral carbonation plant (5) is similar to that shown in FIG. 1 however in this case it is used to sequester carbon dioxide drawn from the atmosphere. The carbon dioxide is drawn from the atmosphere in a generic capture plant (2) that uses a regenerated capture medium such as ammonia or solutions of ammonia compounds such as ammonium carbonate to react with the carbon dioxide to form carbonates or bicarbonates. The generic capture plant (2) then concentrates the carbon dioxide (29) and regenerates and recycles the capture medium (28) back to the capture plant (2). The concentrated stream of carbon dioxide (3) is then fed to the mineral carbonation plant (5) whose details are similar to those of FIG. 1 and unless specified otherwise comprises components labelled as for FIG. 1.

Figure 4:
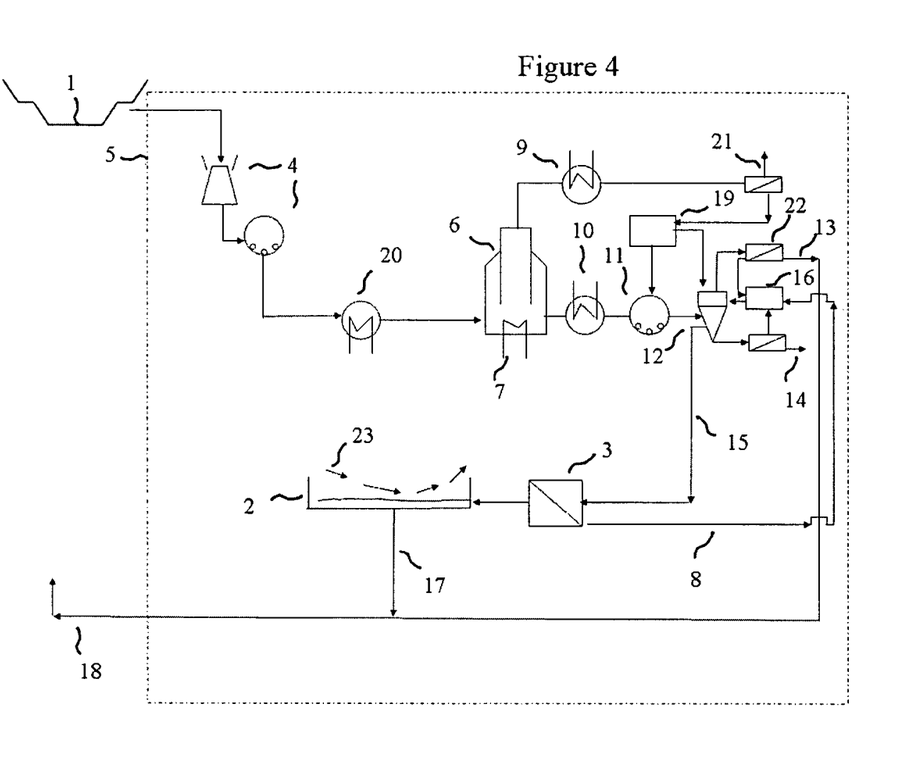

FIG. 4 illustrates another flow diagram of a particular embodiment of the invention. In this example the mineral carbonation plant (5) provides direct thermal activation of the magnesium silicate hydroxide mineral feedstock and subsequent separation of the metal oxides substantially excluding magnesium oxide and magnesium silicate, but the carbonation reaction is not conducted in a pressurised reaction vessel. Instead, in this example the carbonation reaction occurs in systems of open vessels, fields, slurry dams, absorption towers, aerated stockpiles or heap leach arrangements containing the residual activated feedstock and exposed to the atmosphere to provide contact with carbon dioxide.

FIG. 4 shows a mine or quarry (1) where the magnesium silicate hydroxide mineral is extracted. The mineral is crushed and ground in comminution circuits (4) to a particle size of less than 500 microns and fed into a series of heat exchangers (20) to preheat the mineral feedstock and a final heating vessel (6) for direct thermal activation. The series of optional heat exchangers (20) utilise heat drawn from other points in the process where cooling is effected. Such points include cooling the activated feedstock after thermal activation (10) and cooling the hot flue gases and condensing water (9) arising from the direct thermal activation vessel (6). The final and essential heating vessel (6) comprises a furnace fired by a hydrocarbonaceous fuel, in this case natural gas (7), to provide direct thermal activation of the ore raising its temperature to at least around 580° C. Water of dehydroxylation is recovered from the flue gases in a condenser (9), separated from the remaining flue gases (21) and used in the process, for example as shown here in making up a slurry (19) for wet milling (11) to a final particle size of less than 75 microns after cooling (10) the mineral.

Further aqueous solvents may optionally be added (16) for operation of the separation stage (12), where metal oxides (14) and (13) are substantially separated from the residual activated magnesium silicate feedstock (15) using density separation. In this example the metal oxide separation stage (12) comprises a series of hindered settling tanks in combination with hydrocyclones. The low density fraction (13) largely comprises metal oxides such as silica which are of low economic value and may be disposed (18) back to the mine (1) after recovery (22) of the aqueous solvents which are recycled into the process, for example at (16) as shown here. The high density fraction (14) comprises metal oxides of high economic value such as iron oxides and which are further processed for sale after recovery of aqueous solvents which are re-used in the process, for example at (16). The residual activated feedstock (15) comprising largely magnesium silicate is then used in systems of aerated or open fields, dams, vessels, heap leach arrangements or the like after recovery (3) of the aqueous solvents and re-use of said solvents in the process, for example as shown here at (16).

In FIG. 4, the activated feedstock is mixed with suitably selected slurry solvents and reagents (16) that may assist in dissolution of atmospheric carbon dioxide in the systems of aerated or open fields, dams, vessels, heap leach arrangements or the like and conversion of the carbon dioxide to magnesium carbonates. The said systems of aerated or open fields, dams, vessels, heap leach arrangements or the like are designed to optimally expose the residual activated mineral to contact with carbon dioxide in the atmosphere. Arrangements for enhanced air flow (23) and dissolution of atmospheric carbon dioxide, such as systems of air channels and solvent sprays will assist in the carbonation process. Furthermore, arrangements such as solvent sealing layers or membranes typically found in leaching operations for solvent recovery will typically be employed. Exposure of fresh unreacted activated feedstock to carbon dioxide will be enhanced by continual removal of reacted layers of magnesium carbonates, for example by periodic surface scraping. Layers thus removed can be disposed back to voids formed in the original mine or quarry (1) where the magnesium silicate hydroxide mineral is extracted.

It will be apparent to those skilled in the art that various modifications, omissions or additions may be made without departing from the scope of the invention which is not limited to the specific embodiments and examples described herein. It is to be understood that the invention includes all such variations and modifications that fall within the spirit and scope. The invention also includes all of the steps, features, compositions and compounds referred to or indicated in this specification, individually or collectively, and any and all combinations of any two or more of said steps or features.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgement or any form of suggestion that prior art forms part of the common general knowledge of the countries in which this application is filed.

The claims defining the invention are follows:

1. A process for converting carbon dioxide into solid material, which process comprises the steps of:
   direct thermal activation of magnesium silicate hydroxide mineral feedstock by combustion of fuel to produce an activated feedstock;
   separation from the activated feedstock of metal oxides at least substantially excluding magnesium oxide and magnesium silicate to produce a residual activated feedstock;
   before said separation step, suspension of the activated feedstock in a solvent to form a slurry of activated feedstock or, after said separation step, suspension of the residual activated feedstock in a solvent to form a slurry of residual activated feedstock; and
   contacting the slurry of residual activated feedstock with carbon dioxide to convert the carbon dioxide into magnesium carbonate.

2. A process according to claim 1, wherein the magnesium silicate hydroxide mineral feedstock is mostly comprised of serpentine or talc.

3. A process according to claim 1, wherein the metal oxides separated from the activated feedstock comprise oxides of one or more of iron, silicon, aluminium, manganese, chromium, nickel, titanium, copper, potassium, phosphorus, calcium and sodium.

4. A process according to claim 1, wherein direct thermal activation of the magnesium silicate hydroxide mineral feedstock occurs by application of the heat released by combustion of hydrocarbonaceous fuel in a furnace, kiln, fluidised bed furnace or similar combustion chamber or heating vessel.

5. A process according to claim 1, wherein the magnesium silicate hydroxide mineral feedstock is pre-heated prior to direct thermal activation by application of the heat released by combustion of fuel using heat liberated from the reaction of carbon dioxide with the activated feedstock and/or low grade or waste heat drawn from an associated carbonaceous or hydrocarbonaceous fuel combustion, gasification, reforming or electricity generation process and/or heat drawn from cooling the products from a fuel-fired heating vessel and/or heat drawn from cooling carbon dioxide after compression.

6. A process according to claim 1, wherein direct thermal activation of the feedstock takes place by raising and maintaining the temperature of said feedstock to a temperature of at least about 580° C.

7. A process according to claim 1, wherein the magnesium silicate hydroxide mineral feedstock is heated in a series of heat exchangers and heating vessels in an essentially dry state such that the magnesium silicate hydroxide mineral feedstock is transported through said series of heat exchangers and heating vessels without the addition of any liquid to said feedstock thereby decreasing the thermal requirements for the heating process.

8. A process according to claim 1, wherein the magnesium silicate hydroxide mineral feedstock is heated in a heating vessel that is designed to rotate and/or agitate the magnesium silicate hydroxide mineral feedstock during heating thereof to assist in dehydroxylation and activation.

9. A process according to claim 1, wherein the magnesium silicate hydroxide mineral feedstock is heated in isolation from the combustion gases of the fuel via radiation, conduction or convection from the fuel combustion chamber in a suitably designed heating vessel.

10. A process according to claim 1, wherein direct thermal activation of the magnesium silicate hydroxide mineral feedstock takes place in an oxygen-lean, hydrocarbonaceous fuel-comprising combustion mixture, such that the oxygen content of the combustion mixture is lower than the stoichiometric requirement for complete combustion of the carbon content of the hydrocarbonaceous fuel to carbon dioxide.

11. A process according to claim 1, wherein water released by dehydroxylation reaction in the direct thermal activation step is recovered for re-use in the process in a condenser provided on an output gaseous stream from the said direct thermal activation step.

12. A process according to claim 1, wherein the feedstock is subjected to comminution to reduce the feedstock average particle size to less than about 500 microns.

13. A process according to claim 12, wherein the activated feedstock is mixed with an aqueous solvent and subjected to further comminution after the direct thermal activation step but before the separation step to achieve a particle size of less than 75 microns.

14. A process according to claim 1, wherein the separation of the metal oxides at least substantially excluding magnesium oxide and magnesium silicate to produce a residual activated feedstock is achieved using a gravity or density separation process.

15. A process according to claim 1, wherein the separation of the metal oxides at least substantially excluding magnesium oxide and magnesium silicate to produce a residual activated feedstock is achieved using a combination of density separation processes and magnetic and/or electrostatic separation processes.

16. A process according to claim 1, wherein the activated feedstock is suspended in a weakly acidic aqueous or mixed aqueous and/or saline or other solvent miscible with carbon dioxide before contact with the carbon dioxide.

17. A process according to claim 16, where the solvent is chosen from one or more of water, weak acids, salt solutions of weak acids, saline solutions, aqueous saline and sodium bicarbonate solutions, potassium bicarbonate solutions, mixed aqueous and alcohol solutions, mixed aqueous and glycol solutions, mixed aqueous and glycerol solutions.

18. A process according to claim 1, wherein the carbon dioxide is in dilute streams or is drawn directly from the atmosphere.

19. A process according to claim 1, wherein the carbon dioxide is contacted with the residual activated feedstock in a system of open vessels, fields, slurry dams, absorption towers, aerated stockpiles or heap leach arrangements containing the activated feedstock.

20. A process according claim 1, wherein the residual activated feedstock is contacted with supercritical, liquefied or high-pressure gaseous carbon dioxide to substantially convert the carbon dioxide to magnesium carbonate.

21. A process according to claim 20, where the carbon dioxide and residual activated feedstock are contacted in a reaction vessel that is designed to provide highly turbulent or rapidly dispersive or attritive conditions to rapidly and substantially convert the carbon dioxide to magnesium carbonate.

22. A process according to claim 21, where the reaction vessel is provided with a recycle stream which circulates and returns unreacted feedstock, solvent and other reagents to the carbonation reaction vessel.

23. A process according the claim 22, where the recycle stream incorporates a further separation stage that substantially separates silica and magnesium carbonate from substantially unreacted feedstock to return said substantially unreacted feedstock to the reactor.

24. A process according to claim 23, where the separation stage utilises gravity or density separation.

25. A process according to claim 1, where energy recovered from a cooling operation is employed to drive pumps or compressors for compression of the carbon dioxide.

* * * * *